United States Patent [19]
Adiano et al.

[11] Patent Number: 5,278,751
[45] Date of Patent: Jan. 11, 1994

[54] DYNAMIC MANUFACTURING PROCESS CONTROL

[75] Inventors: Cynthia A. Adiano; Robert G. Raines, Jr., both of Austin; Robert B. Rowen, Round Rock, all of Tex.

[73] Assignee: International Business Machines Corporation, Armonk, N.Y.

[21] Appl. No.: 752,711

[22] Filed: Aug. 30, 1991

[51] Int. Cl.$^5$ .................. G06F 15/46; G06F 15/60
[52] U.S. Cl. ...................................... 364/402; 395/925
[58] Field of Search ........... 364/401, 402, 550, 551.01; 395/925

[56] References Cited

U.S. PATENT DOCUMENTS

| | | | |
|---|---|---|---|
| 3,628,904 | 12/1971 | Canguilhem | 364/401 |
| 4,648,044 | 3/1987 | Hardy et al. | 364/513 |
| 4,775,935 | 10/1988 | Yourick | 364/401 |
| 4,847,761 | 7/1989 | Ferriter et al. | 364/401 |
| 4,866,634 | 9/1989 | Reboh et al. | 364/513 |
| 4,884,218 | 11/1989 | Agnew et al. | 364/513 |
| 4,890,240 | 12/1989 | Loeb et al. | 364/513 |
| 4,931,933 | 6/1990 | Chen et al. | 364/409 |
| 4,937,743 | 6/1990 | Rassman et al. | 364/401 |

OTHER PUBLICATIONS

"Quality Function Deployment," L. P. Sullivan, Quality Progress, Jun. 1986, pp. 39-50.
"The Role of Taguchi Methods and Design of Experiments in QFD," Phillip Ross, Quality Progress, Jun. 1988, pp. 41-47.
"HOuse of Quality," J. R. Hauser, D. Clausing, Harvard Business Review, May-Jun. 1988, pp. 63-73.
"Quality Function Deployment: An Application Perspective from Digital Equipment Corporation," Louis Cohen, National Productivity Review, Summer, 1988, pp. 197-208.
"Technical Information Engineering System (TIES)," L. S. Vora, R. E. Veres, P. C. Jackson, pp. 37-46.
"TIES: An Engineering Design Methodology and System," L. S. Vora, R. E. Veres, P. C. Jacksons, P. Klahr, pp. 131-144.

*Primary Examiner*—Donald E. McElheny, Jr.
*Attorney, Agent, or Firm*—Mark E. McBurney

[57] ABSTRACT

A system and method for linking Quality Function Deployment (QFD) data and actual process data is provided and uses a knowledge based expert system in combination with QFD principles to provide an interactive system capable of allowing dynamic changes to a manufacturing process in response to customer input regarding their requirements and ultimate satisfaction. The system expands upon a central element of QFD analysis, relationships between objects, by providing navigation and manipulation aids. Dynamic evaluation is possible and enables the detection of shifts in customer preference or needs. This is accomplished in part by remodeling the QFD House of Quality by enlarging it to accommodate additional matrices of data not previously associated with the QFD house. Further, a relational database is provided for correlating data about the manufacturing process and customer needs as well as new matrices, one of which maps product parameters to the customer data or the manufacturing process data. Another matrix identifies responsibility for control, or ownership of particular product parameters. Additionally, analysis methods and customer survey data can be identified by matrices added to the relational data-base.

24 Claims, 12 Drawing Sheets

| Type A, Customer Needs Record ||
|---|---|
| Field Name | Field Type |
| Description | Alpha |
| Importance | Numeric |
| Rank Competitor | Numeric |
| Rank My Product | Numeric |

FIG. 3

| Type B, Product Properties Record ||
|---|---|
| Field Name | Field Type |
| Description | Alpha |
| Units | Numeric |
| Cost per Unit | Numeric |
| Hi-Limit | Numeric |
| Lo-Limit | Numeric |
| Taxonomy | Alpha |
| Direction Change | Alpha |

FIG. 4

| Type C, Relationships Between Needs and Product Property Record ||
|---|---|
| Field Name | Field Type |
| Need | Alpha |
| Property | Alpha |
| Strength | Numeric |
| Plus-Minus | Numeric |

FIG. 5

| Type D, Relationships Between Product Properties Record ||
|---|---|
| Field Name | Field Type |
| Property 1 | Alpha |
| Property 2 | Alpha |
| Strength | Numeric |
| Plus-Minus | Numeric |

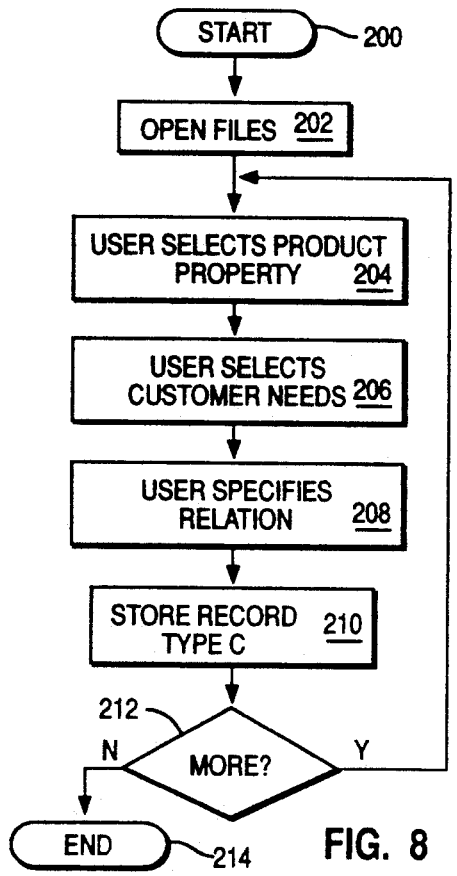
FIG. 8
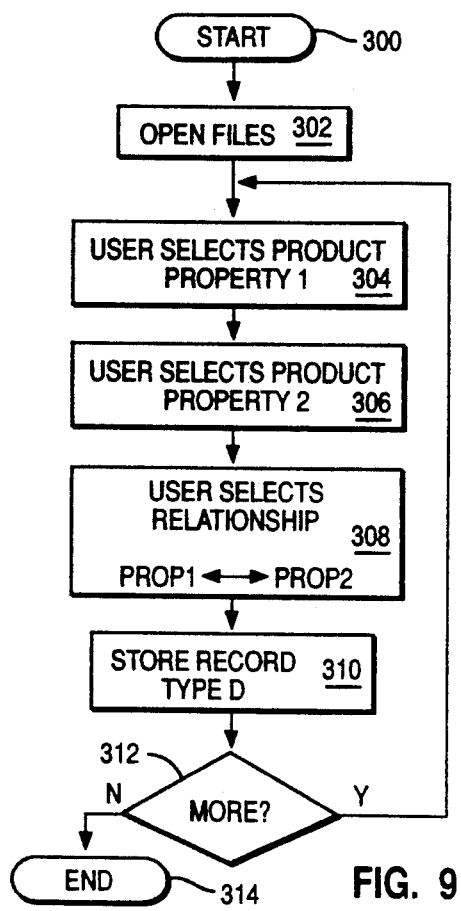
FIG. 9
FRAME TYPE: CUSTOMER "C FRAME"
FRAME NAME
| SLOT | VALUE |
|---|---|
| LABEL | Contents |
| Description | |
| Importance | |
| Depends_Strongly_P<br>Depends_Medium_P<br>Depends_Weakly_P<br>Depends_Strongly_M<br>Depends_Medium_M<br>Depends_Weakly_M | Property (Fig. 5) |
| Rank_Competitor<br>Rank_My_Product<br>DB_Key_Satisfaction | Customer Survey |
FIG. 10

Frame Type : Product "P Frame"

| SLOT | VALUE |
|---|---|
| Frame Name | |
| Description | |
| Units | |
| Measurement | |
| Cost_per_Unit | |
| Effects_Strongly_P | Needs (Fig. 5) |
| Effects_Medium_P | |
| Effects_Weakly_P | |
| Effects_Strongly_M | |
| Effects_Medium_M | |
| Effects_Weakly_M | |
| Direction | |
| Impacts_Strongly_P | Property 2 (Fig. 6) |
| Impacts_Medium_P | |
| Impacts_Weakly_P | |
| Impacts_Strongly_M | |
| Impacts_Medium_M | |
| Impacts_Weakly_M | |
| Method | Method (Fig. 18) |
| Current_Trend | |
| Hi_Limit | |
| Lo_Limit | |
| Taxonomy | |
| Owner | Owner (Fig. 17) |
| DB_Key | Prop.Name(Fig.16) |

FIG. 11

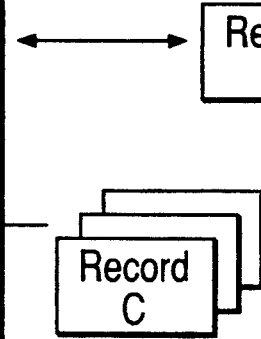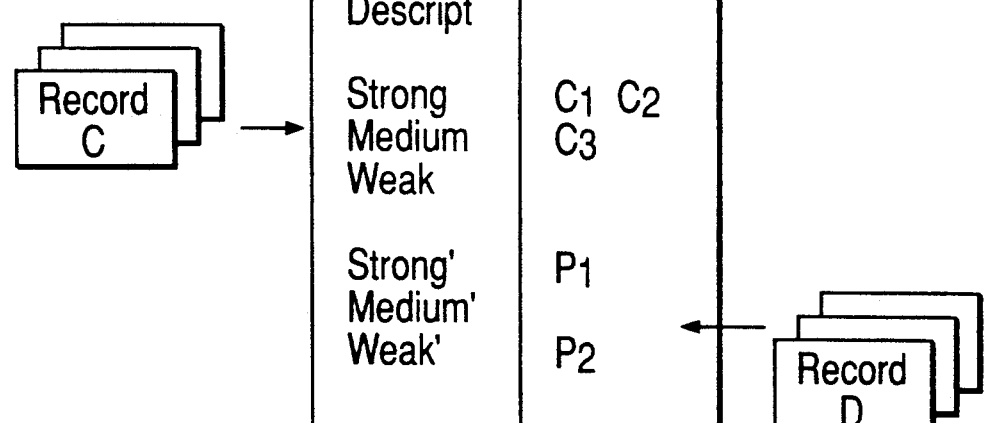
FIG. 12

| SLOT | VALUE |
|---|---|
| Description  Units  Measurement  Cost Per Unit  Effects Strongly  •  •  •  Impacts Strongly_P  •  •  •  Method  •  •  • | Property 1 (Fig. 6) |

FIG. 15

| Type E, Test Results Record ||
|---|---|
| Field Name | Field Type |
| Property Name | Alpha |
| Property Size/Definition | Alpha |
| Test - Parm Key | Alpha |

| Type E, Process Parameters Record ||
|---|---|
| Field Name | Field Type |
| Property Name | Alpha |
| Property Size/Definition | Alpha |
| Test - Parm Key | Alpha |

FIG. 16

| Type F, Product Property Owner Record ||
|---|---|
| Field Name | Field Type |
| Property Name | Alpha |
| Owner | Alpha |

| Type G, Product Property Analysis Method Record ||
|---|---|
| Field Name | Field Type |
| Property Name | Alpha |
| Method Name | Alpha |

DYNAMIC MANUFACTURING PROCESS CONTROL

BACKGROUND OF THE INVENTION

1. Field of the Invention

The present invention relates generally to interactive computer based manufacturing control systems, and more particularly to a system for integrating changes and customer feedback responses into the manufacturing process.

2. Description of Related Art

Customer preference and satisfaction are typically measured in the early planning stages of a product development cycle. In recent years quality function deployment (QFD) techniques have been used to integrate customer wants and perceptions, product characteristic and technical interaction of product characteristic into the product planning process. QFD concepts are described in the article "The House of Quality," Harvard Business Review by Hauser et al, May/June, 1988, pages 63-7, hereby incorporated by reference.

QFD techniques include the use of interrelated tables which map relationships between customer data and product characteristics. Such an approach helps to establish manufacturing targets for performance, that results in a static description used only in early design efforts. Other techniques such as control charts have been used for ongoing or real time control of a manufacturing process. QFD has been used primarily as a manual design tool although entry and manipulation and display of the data has been automated, as for example by the software offerings QFD Plus and QFD/capture. These products are commercially available and do much to simplify the drudgery of entering the data comprising the House of Quality used with much success as a planning tool.

Similarly, as described by Cohen in the article "Quality Function Deployment: an Application Prospective" from Digital Equipment Corporation, National Productivity Review, summer 1988, pages 197-208, the use of an electronic spread sheet is described for managing the vast amount of data necessary to affect QFD use. While great success has been described in the literature regarding the use of QFD principles and manufacturing, a continuing aspect worthy of mention is the personnel resources necessary to effectively use QFD due to the amount of training required to fully utilize vast amount of data.

The use of expert systems to other applications involving artificial intelligence are becoming more prevalent. There are many examples of knowledge base systems in use. U.S. Pat. No. 4,884,218 to Agnew et al describes an expert system for determining machine configurations. U.S. Pat. No. 4,866,634 to Rebow et al discloses an expert system shell for using computing functions of variables and response to numeric and symbolic data values input by the user. U.S. Pat. No. 4,775,935 to Yourick discloses a multimode video merchandiser system for selecting, based on user preferences, a sequence in which images of products stored in a video disk are presented on a monitor to a user. U.S. Pat. No. 4,648,044 discloses a basic expert system tool for building a knowledge system and running a consultation on a computer.

It is therefore apparent that there is a need for refining techniques for manipulating and displaying vast unwieldy amounts of data associated with QFD activity. Because so much data is generated in building a House of Quality, the data is susceptible to use in a knowledge based expert system. A means of combining or using in tandem the advantageous features of an expert system and QFD is desirable to minimize the time for decision making based on product knowledge and facts. Further, a need exists to dynamically link the QFD customer and product data with the actual production data such that a process tool that allows production data to be manipulated based upon customer needs and product properties is created.

SUMMARY OF THE INVENTION

The present invention uses a knowledge based expert system in combination with QFD principles to provide an interactive system capable of allowing dynamic changes to a manufacturing process in response to customer input regarding their requirements and ultimate satisfaction. The system expands upon a central element of QFD analysis, relationships between objects, by providing navigation and manipulation aids. Dynamic evaluation is possible and enables the detection of shifts in customer preference or needs.

The present invention accomplishes this end in part through remodeling the House of Quality by enlarging it to accommodate additional matrices of data not previously associated with the QFD house.

The system of the present invention includes a relational database for correlating data about the manufacturing process and customer needs as well as new matrices, one of which maps product parameters to customer data or the manufacturing process data. Another matrix identifies responsibility for control, or ownership of particular product parameters. Additionally, analysis methods and customer survey data can be identified by matrices added to the relational database.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 3 is a table showing a customer needs type record for storing information in the House of Quality;

FIG. 4 is a product properties record which is stored in the House of Quality;

FIG. 5 is a table of the relationships between the customer needs and product properties within the House of Quality;

FIG. 8 is a flowchart showing the steps required to store a record which shows the relationship between customer needs and product properties;

FIG. 9 is a flowchart showing the steps required to store a record representing the correlation between different product properties;

FIG. 10 is a frame to be used with a knowledge system database having a slot and value which indicates the relationship between customer need and product properties;

FIG. 11 is a frame showing the correlation between different product properties;

FIG. 12 is a schematic representation of the linkage between customer needs record and product property records, as well as linkages between different product property records and customer needs records;

FIG. 15 is another product property frame, similar to FIG. 11 and used to describe the relationship therebetween;

FIG. 16 is a table of data including test results and process parameter contained in the actual production database;

DETAILED DESCRIPTION OF THE PREFERRED EMBODIMENTS

Figure 1:
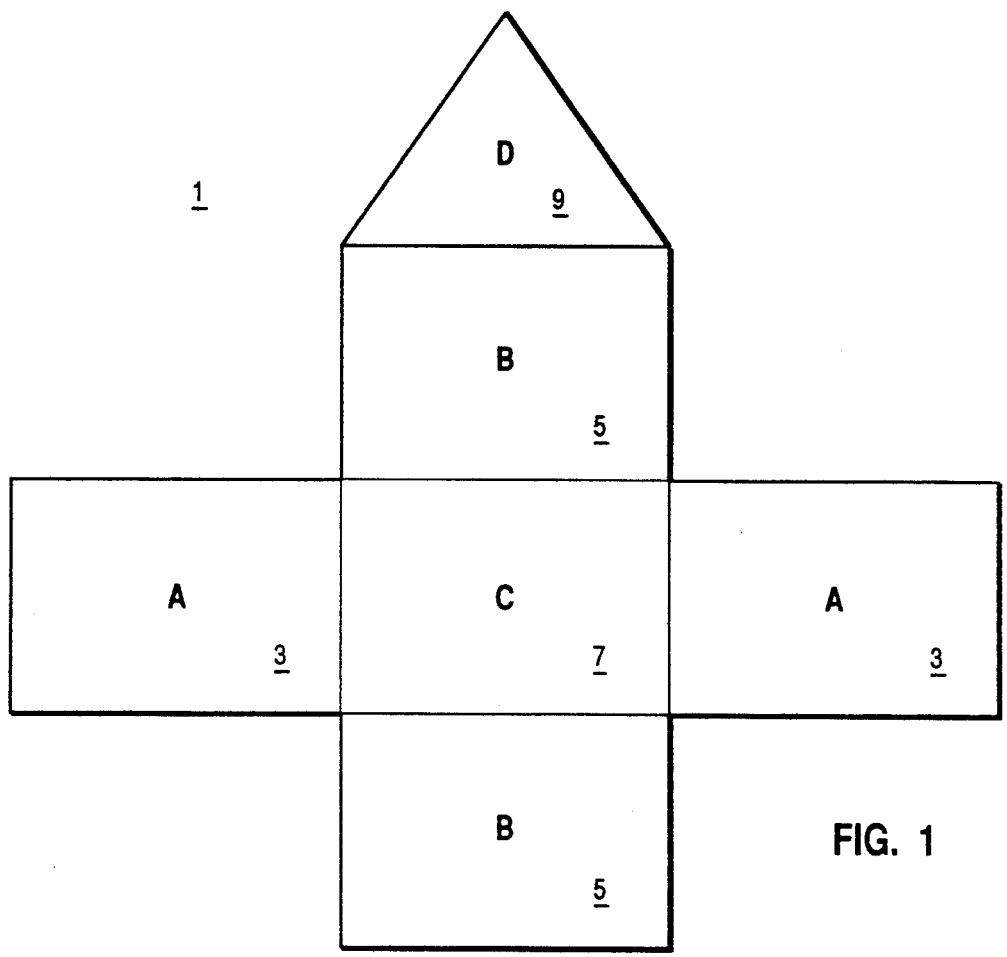
FIG. 1 is a schematic representation of a typical House of Quality including customer needs data, product properties data and the relationships between customer needs and product properties, as well as the correlation between different product properties.

Referring to FIG. 1 a schematic representation of a House of Quality is shown and generally referred to by reference numeral 1. A matrix of customer needs data, or type A records, are shown by reference numeral 3. A matrix for product properties data 5, or B type records is also shown in FIG. 1. The House of Quality matrix for type C records (relationship between customer needs and product properties) is shown by reference numeral 7 and the matrix for type D records (correlation between different product properties) is shown by reference numeral 9.

Figure 2:
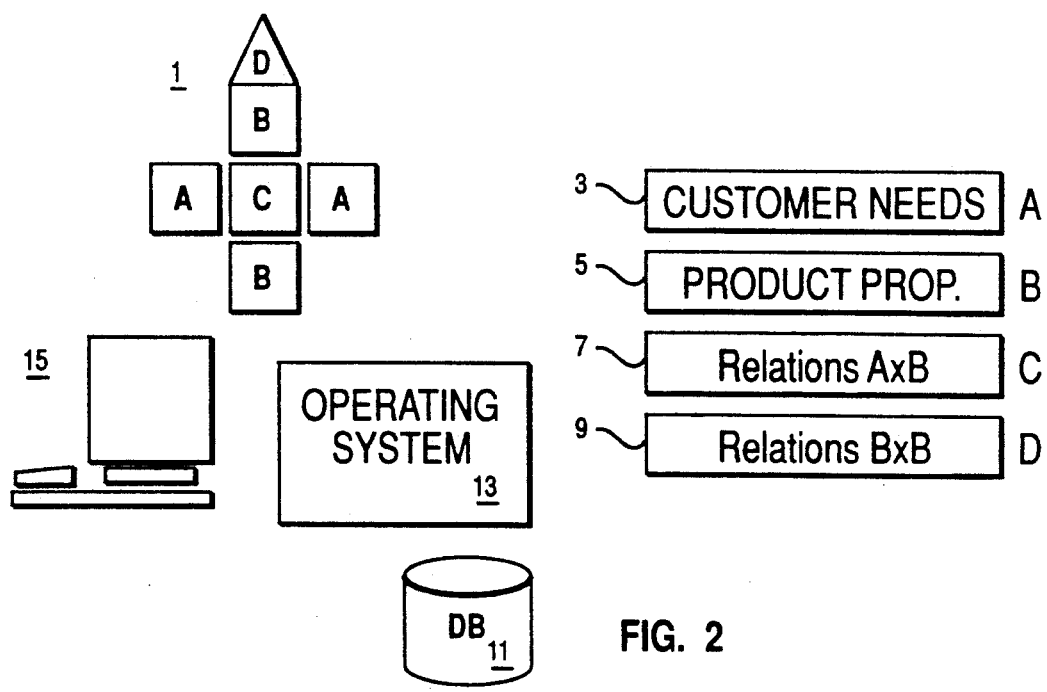
FIG. 2 is a schematic diagram showing the present invention including the House of Quality and its relation to the components of the present invention.

FIG. 2 is a schematic of the present invention and shows the House of Quality 1 input into a database 11 via a workstation 15 and operating system 13. It should be noted that the present invention can be implemented on a number of different hardware and software platforms. For example workstation 15 may be a PS/2 and operating system 13 may be the OS/2 System (PS/2 and OS/2 are Trademarks of IBM Corporation), or the workstation can be a RISC System/6000 and operating system 13 can be the AIX system (RISC System/6000 and AIX are trademarks of IBM Corporation). Customer needs data 3, product property data 5, the relationship data between the customer needs and product property 7 and the correlation data between product properties 9 is shown in FIG. 2 as being contained within database 11.

FIG. 3 is a table of a type A customer needs record which is used to store the customer needs data in the House of Quality 1. It can be seen that the table of FIG. 3 includes fields corresponding to the description, importance and ranking of the product by the customer. More particularly, the Description field is a textual description of the customer wants and needs. For example, for an automobile manufacturing production database, the Description of a customer need may include a smooth riding automobile. The field of Importance field is a ranking of the need when compared with other customer needs that will also be input to the House of Quality 1, i.e. how important is a smooth ride. The Rank Competitor field asks the customer how the competitor's product is perceived by the customer, whereas the Rank My Product field is the customer perception of the product being manufactured, e.g. how does one automobile rank against the current manufacturer's automobile. It can be seen that the types of fields vary depending upon the information being input. The Description will be alphabetical characters whereas the Importance and Ranking fields are represented by numerical characters.

FIG. 4 is a product properties record, or B type record 5 and includes fields that will provide information related to the specific product property being entered into the House of Quality 1. The Description field is a textual description of the product property, such as pigment which will be used to alter the color of the paint for an automobile. The Units field describes a quantity being measured, such as volume in grams or cubic centimeters. Further, a field for Cost per Unit of this product property is included in a table of FIG. 4. Also included are High and Lo (low) limits fields for the product property (which may include upper and lower process control (limits). For example assuming the color of the paint is red the high limit may indicate an extremely bright shade of red whereas the lower limit may indicate a pale shade, wherein the shade is dependent on the amount of pigment used. The Taxonomy field indicates the actual name of the substance used to create the property. For example, with the property of pigment, the Taxonomy may include lacquer or acrylic. The Direction Change field signifies a desired direction of change that will improve the product property. If the customer need indicates a bright red car, then a positive increase in pigment would be desired, conversely if a lighter color car is desired then less pigment would correspond to the customer need. Again, the fields are alpha and numeric and are related to the type of information being entered in the particular fields. It can be seen that the number of fields contained in type A and B records is not limited to those shown in FIGS. 3 and 4, which are merely examples of fields contemplated by the present invention.

FIG. 5 is table showing a type C record which is a relationship between customer needs and product properties (relationship between type A and B records). The field of Need shows the customer need and is the same information provided in the description portion of the type A record of FIG. 3. The Property field in FIG. 5 is the identical information from the Description field of the product property record shown in FIG. 4. The texts in these fields must be identical to the corresponding type A and B records Description counterparts in order to ensure that a match will occur and the records can be retrieved. In this manner, the Description field of type A and B records are used as a key to relate various records to one another. All QFD schemes use the strength of a relationship as a means of showing how at least two objects affect one another. The Strength field shown in FIG. 5 is used as a means of quantifying the strength of the relationship between the product property and customer needs. A numeric ranking system can be used wherein numeral 1 indicates a weak relationship while the number 10 indicates a very strong relationship. For example, a customer need indicating the desire for a quiet automobile has a very weak relationship with regard to the product property of paint color. On the other hand, the customer need for a quiet automobile may have a very strong relationship with the product property corresponding to the type of insulation material placed around the passenger compartment. The Plus-Minus field of FIG. 5 indicates the impact of the relationship between the customer and the product property that is being associated in the table of FIG. 5 That is, whether or not the relationship is considered to be good for the product as a whole, e.g. utilization of a type of insulation creates a quiet automobile would be considered good and a plus would be indicated in the field of the table of FIG. 5.

Figures 6, 7:
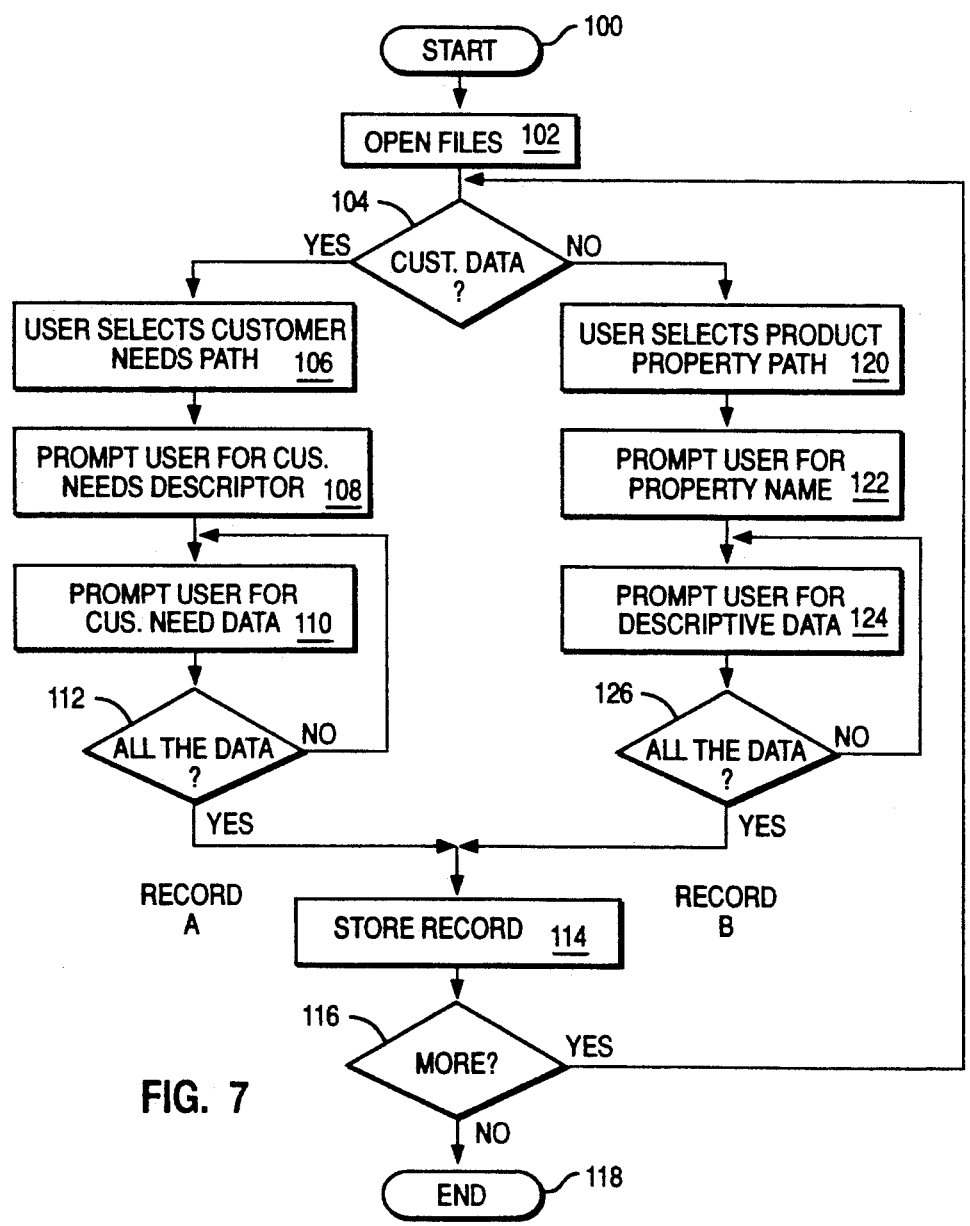
FIG. 6 is a table showing the correlation between the different product properties records within the House of Quality.
FIG. 7 is a flowchart illustrating the steps required to open records in the House of Quality for customer needs data and product property data, as shown in FIGS. 3 and 4.

FIG. 6 is a table representing type D records which in the context of the House of Quality are the correlation between different product properties and how effecting the first property may also have an affect on another property. Two Property (Property1 and Property2) fields are shown in the table of FIG. 6. The first product property will be identical to a Description field of the product property record of FIG. 4 and the second property product field will be identical to the Description field of a different product property record as shown in FIG. 15. The Strength field indicates the linkage between the two properties (Property1 and Property2) and is similar to the strength field described above with respect to FIG. 5. The Plus-Minus field has the same meaning attached to the Plus-Minus field of FIG. 5, i.e. is the relationship between the two properties shown in the record of FIG. 6 a positive or negative one.

Referring to FIG. 7, a flowchart is shown which includes the steps required for a user to enter the the customer needs and product property data required to build the type A and B records for the tables of FIGS. 3 and 4. At step 100 the process is started and the respective customer needs and product properties files, that make up matrices 3 and 5 of House of Quality 1, are opened at step 102. Whether customer needs or product properties data is to be entered is determined at step 104. If customer data is to be entered, then the user at step 106 selects a customer needs path. The system of the present invention then prompts the user for a description of the customer needs (see the Description field of FIG. 3) at step 108. The user is then prompted at step 110 for the customer needs data of the remaining fields of the table of FIG. 3. Step 112 then determines whether all the data has been entered and if so, proceeds to step 114. If all the data has not be entered then step 112 returns to step 110 and the user is continually prompted for customer needs data. At step 114 the record of the customer needs data is stored in matrix 3 of the House of Quality 1 in the form of the table of FIG. 3. Step 116 determines if there is more data to be entered and if so, the process returns to step 104. If all data has been entered then the flowchart proceeds to step 118 and ends. Assuming that additional data is to be entered it is again determined at step 104 if the data is customer needs or product properties. If the data is not customer needs data the process continues to step 120 where the user selects the product property path. At step 122 the user is prompted for the Property Name which is the description information of the type B record of FIG. 4. At step 124, the user is then prompted for the descriptive data (the data corresponding to the remaining fields in the table of FIG. 4). At step 126 it is determined if all the data has been entered and if so, the process continues to step 114 where the record is stored in the matrix 5 of FIG. 1. Subsequent to step 114 the flowchart continues as described above. If it was determined that all of the data had not been entered at step 126, then the flowchart returns to step 124 where the user is continually prompted for the additional descriptive data.

Referring to FIG. 8 a flowchart is shown which characterizes the steps required to store a type C record indicative of relationships between customer needs and product properties in the matrix 7 as shown in FIG. 1. At step 200 the process is started and the customer needs and product properties files are opened at step 202. The user then selects the particular product property at step 204 and customer need at step 206. It can be seen that steps 204 and 206 will result in a creation of the fields Need and Property as shown in FIG. 5. Next, at step 208 the customer specifies the relationship between the Need and the Property that were previously selected, which will result in data corresponding to the Strength and Plus-Minus fields, as shown in FIG. 5. Next this C type record is stored in the House of Quality matrix 7. Step 212 determines if more data is to be entered and, if so, returns to step 204 where the user begins by selecting another product property. If all of the data has been entered then the process continues to step 214 and ends.

Generation of the data to be stored in matrix 9 of the House of Quality, shown in FIG. 1, will be described with reference to the flowchart of FIG. 9. At step 300 the process begins and files relating to the product properties are opened at step 302. At step 304 the user selects a first product property (Property1) and then selects a second property (Property2) at step 306. This information corresponds to the first two Property fields which are included in FIG. 6, which is a type D record. At step 308 the user then provides the correlation between Property1 and Property2 which will make up the data stored in the fields of Strength and Plus-Minus of the table shown in FIG. 6. This data is then stored in the matrix 9 of FIG. 1 as a type D record at step 310. Step 312 then determines if more data is to be entered and if so returns to step 304 where the user selects another product property. If at step 312 it is determined that all of the data has been entered then the process continues to step 314 and ends.

Thus far, it has been shown that data in the form of Type A,B,C,D records, has been entered into matrices within a House of Quality in an orderly fashion. Next, it will be described how this data can be interconnected or linked together in a dynamic relationship. Further, additional production data as well as customer survey data and the like can be linked with the House of Quality data.

A common means of storing and manipulating data in a knowledge based system is to represent this data as a frame. Knowledge based systems (KBS) are capable of manipulating logic structures which are written in the forms of frames. It will be seen from the subsequent description why a knowledge based system provides the preferred means for providing the dynamic like between House of Quality data and the actual production data.

Referring to FIG. 10, a common representation of a frame is shown. FIG. 10 is a template of a customer need frame and includes two columns which are referred to as a slot and value. In essence, a frame is a logical collection of pairs, i.e. the slot-value tuple. The slot is actually a place holder and may be referred to as a label. When writing software control logic, rules can reference a specific slot by concatenating the frame name and the label. For example, to get the customer importance for an automobile being quiet, an equation with QUIET_IMPORTANCE is written into the rules of the knowledge based system. That is, the equation is written into the frames and rules storage area 35 of FIG. 14 with inference engine 29 being capable of interpreting the rule. It should be noted that the slot-value fields for the frame at the time of creation of the frame do not have to be complete, i.e. all of the values included in the other fields of the frame can be replaced or created dynamically. Next, the contents of a slot within a frame will be described. The contents of a slot are a list of one or more values related to each entry in the label field within the frame. It will be seen that more than one value will be utilized when two or more frames are linked together. It can be seen that the customer need for a quiet car is strongly affected, or linked, to the engine noise and amount of insulation surrounding the passenger compartment in the automobile. Generally, a model frame is called a frame type and when values are actually inserted into the slots a frame instance is created. In a typical system a few frame types are utilized, but multiple instances for each type are included. That is, few different frame templates are used, but many templates with values therein are required to represent all relationships within a manufacturing process. In the automobile manufacturing example, there will be multiple customer need instances (quiet, fast fuel efficient, etc.) and product property instances (engine size, amount of insulation, fuel injection system, etc.). Generally, knowledge based systems allow you to create a frame instance dynamically or allows a user to predefine the instance within a compiled program. Additionally, the number of slot values can be altered.

In FIG. 10, a typical customer frame type is shown and includes information which was previously stored in a customer record, i.e. description and importance include identical information recorded in the type A record of FIG. 3. FIG. 10 also shows additional slots which may include information that allows the customer need data of this particular frame to be related to other data in the House of Quality. That is, the relationship of the customer need to a product is defined by slots such as Depends_Strongly, Depends_Medium, Depends_Weakly, or the like. Additionally, slots with information regarding Rank Competitor and Rank My Product are included.

Figure 24:
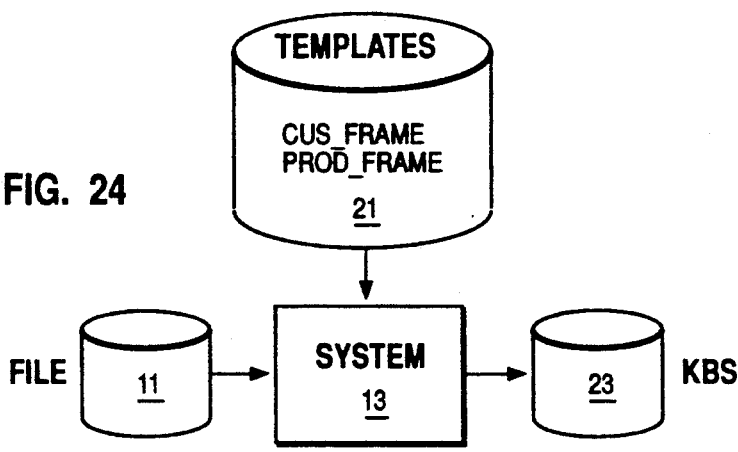

FIG. 24 shows a schematic representation of the interrelationship between the previously discussed House of Quality matrix data, the frame templates, the operating system and the knowledge based system. The House of Quality data is shown and stored in the database file 11 which represents the A, B, C and D type data within matrices 3,5,7,9, respectively of House of Quality 1, as shown in FIG. 1. Operating system 13 is shown, as well as a database 21 which stores frame templates pertaining to customer needs (FIG. 10) and product properties (FIG. 11). The knowledge based system is shown in another database 23. At the command of a user, the House of Quality records 1 are combined with frame templates stored in file 21 by programs included in the operating system 13. Each customer need record, as shown in FIG. 3, is mapped onto a unique allocated area in system memory. Subsequent to this mapping, the template for a customer need frame (FIG. 10) includes the customer needs information (type A records, FIG. 2) and the values of the slots of the frame of FIG. 10 that correspond to the customer needs data of the fields in FIG. 3. In particular, the Description, the Importance. Rank Competitor and Rank My Product fields of FIG. 3 become the Description. Importance, Rank Competitor and Rank My Product values in the slots of FIG. 10. Additional slots in FIG. 10 are allocated for a Database Key satisfaction, and the Depends_Strongly, Depends_Medium, Depends_Weakly slots as previously discussed. The frame Name of FIG. 10 is identical to the Description information set forth in the table of FIG. 3. This mapping process continues until all of the customer needs records have been represented as customer frames. It should be noted that the Depends_Strongly, the Depends_Medium, and the like slots are dependent upon the type of knowledge based system utilized. In a preferred embodiment of the present invention The Integrated Reasoning Shell (TIRS) is utilized and implements frame relationships by linking a first frame with another frame by using the scalar name of the other frame. Other knowledge based systems may establish frame linkages with different syntax or mechanisms and are contemplated by the scope of the present invention.

Referring to FIG. 11, a frame type for a product property is shown. The identical mapping process as previously described with respect to customer needs frames is also utilized to transfer the information from the product properties records of FIG. 4 into the frame of FIG. 11. Description, Units, Cost per Unit, Highlimit, Lo-limit and Taxonomy are all mapped on a one to one basis from the product property record of FIG. 4 into the property frame of FIG. 11. A direction change entry in FIG. 4 is shown as the direction slot in FIG. 11. Additional slots are allocated for Effects_Strongly, Effects_Medium, Effects_Weakly, Impacts_Strongly, Impacts_Medium, Impacts_Weakly, Method, Current Trend and Database Key. Once again, the frame name for FIG. 11 is identical to the description entry in the product record of FIG. 4. Similar to the customer frame, the mapping process continues until all of the records corresponding to each product property have been transferred into a frame format. At this point it can be seen that only the information from the records of FIGS. 3,4 has been mapped into the frames noted by FIGS. 10 and 11. Those skilled in the art will understand that frames contain another field for storing information noted as the Value field. This Value field is utilized by the present invention to create links between various customer need and product property frames stored in system memory. The process for linking related frames together, for manipulation and use by a user of the system of the present invention, will be described with reference to FIG. 12 which shows a customer frame type and a product frame type and their relationship to the records of FIGS. 3,4. Referring to the House of Quality 1, it can be seen that a customer frame type may be related to a product frame type. That is, the A type records (customer needs) are related to the B type records (product properties) and this relationship is stored as a C type record (FIG. 1). Thus, in FIG. 12 it can be seen how the type A data which is in a customer need frame (FIG. 10) has a linkage to product property frames (type B data). The relationship between the customer needs and product properties is characterized as Depends_Strongly, Depends_Medium. Depends_Weakly etc., as previously discussed. It can be seen that a customer need may relate to more than one product property, e.g. in FIG. 12 Depends_Strongly relates to Product Property1 (P1) and product Property2 (P2). For example, the customer need of a quiet automobile may relate to both the engine size and the amount of insulation surrounding the passenger compartment. With regard to a product frame type, it will be understood that product properties can relate not only to customer needs, but also to other product properties. In the example as previously discussed, the product property of engine size will not only relate to the quietness of the automobile (customer needs) but also to the size of the radiator required for cooling the engine (another product property). Thus, again referring to matrix 5 of FIG. 1, it can be seen that the B type records, or product property records, will relate not only to the customer need or A type records (thus creating C type records), but also to other B type records, thereby creating D type records (product property relationships). Referring to FIG. 11, it can be seen that two sets, Effects_Strongly, Effects_Medium, Effects_Weakly and Impacts_Strongly. Impacts_Medium, Impacts_Weakly, of entries are included in the frame such that a link can be made to other product property frames, as well as customer need frames via the appropriate slots.

Figure 13:
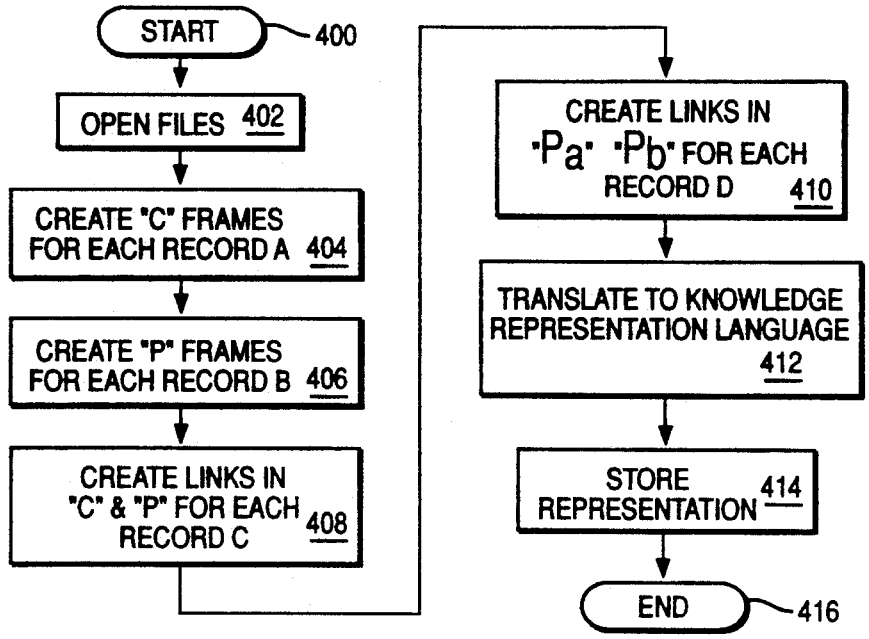
FIG. 13 is a flowchart representing the steps required to create the frame shown in FIGS. 10 or 11 and the links therein between the customer needs data and product property data.

The process for creating the linkage between customer needs frames and product property frames will now be described with reference to the flowchart of FIG. 13. At step 400 the process starts and files containing the A, B, C. D type records, previously stored by the process of FIGS. 7-9 are opened from the database 11 of FIG. 24. At step 404 the C type frames are created for each A record, i.e. customer need frames are created from the customer need records A in matrix 3, using a frame template as previously discussed. At step 406, the product type frames are created for each B type record from matrix 5 of House of Quality 1. Next, links for each C type of record (matrix 7) are created in both the customer need frames and the product property frames at step 408. Links are then created between the distinct product properties for each D type record (matrix 9) and a product property frame at step 410. The created links are then translated at step 412 to a knowledge based representation language This representation is then stored in the knowledge base 23 at step 414 and the process then ends at step 416. To create the links between customer needs and product property records, (step 408) a customer frame instance having a frame name identical to the need field of the type C record in the table of FIG. 5 is found. Next, the property field of the type C record of FIG. 5 is then placed in the value field of the slot of the customer frame instance that corresponds to the strength fields and Plus-Minus fields of the record of FIG. 5. Again, referring to FIG. 10, the property field of FIG. 5 is placed, for example in the value field of the slot of FIG. 10 in the depends strongly category, such that a relationship is established between a type C record and a customer frame such as shown in FIG. 10. The product frame, such as FIG. 11, having a frame name identical to the Property field of the type C record is then found. The information corresponding to the Needs entry of the table of FIG. 5 is then placed in the value field of the slot of the product frame (FIG. 11) that corresponds to the Strength and Plus-Minus fields of FIG. 5 such as the Effects_Strongly slot. Thus, it can be seen that the product frame of FIG. 11 and the customer needs frame of FIG. 10 are linked to one another via the C record data shown in FIG. 5. The present invention continues this linking process until all of the type C relationships between customer needs and product properties have been processed.

The creation of product property links (step 410 of FIG. 10) is performed by searching for a product property frame (FIG. 11) that has frame name which is identical to the first property field (Property1) of the type D record of FIG. 6. The second property field (Property2) of FIG. 6 is placed in the value field of the slot of the product frame of FIG. 11 corresponding to the Strength and Plus-Minus field such as the Impacts_Strongly slot of FIG. 11. Another product frame, such as shown in FIG. 15, having a frame name identical to the second property field of the FIG. 6 is then found and the description in the first property field of the record of FIG. 6 is placed in the value field slot of the second product frame corresponding to the Strength and Plus-Minus fields such as the Impacts_Strongly slot. It can be seen that two separate product frames, such as FIGS. 11 and 15 are linked together through the type D record of FIG. 6. This product process to product process linkage then continues until the list of type D records has been exhausted. In this manner, a second product property frame such as shown in FIG. 15 will be linked to a first product property frame such as shown in FIG. 11 via the type D record shown in FIG. 6. Once the customer needs and product property links are established, the corresponding frame instances which are stored in the database 21 of FIG. 24 are then transferred to permanent storage as an exported image of the knowledge based system 23.

Thus, with the instance resident in memory 21 or 23, a user could interact using a workstation and a knowledge based system to display and manipulate the frames. For example all product properties that have an effect on how quiet the automobile will be are found by examining the slot, of a customer needs frame Quiet, i.e. named Quiet.Depends_Strongly-P and slot Quiet.Depends_Strongly-M.

Figure 14:
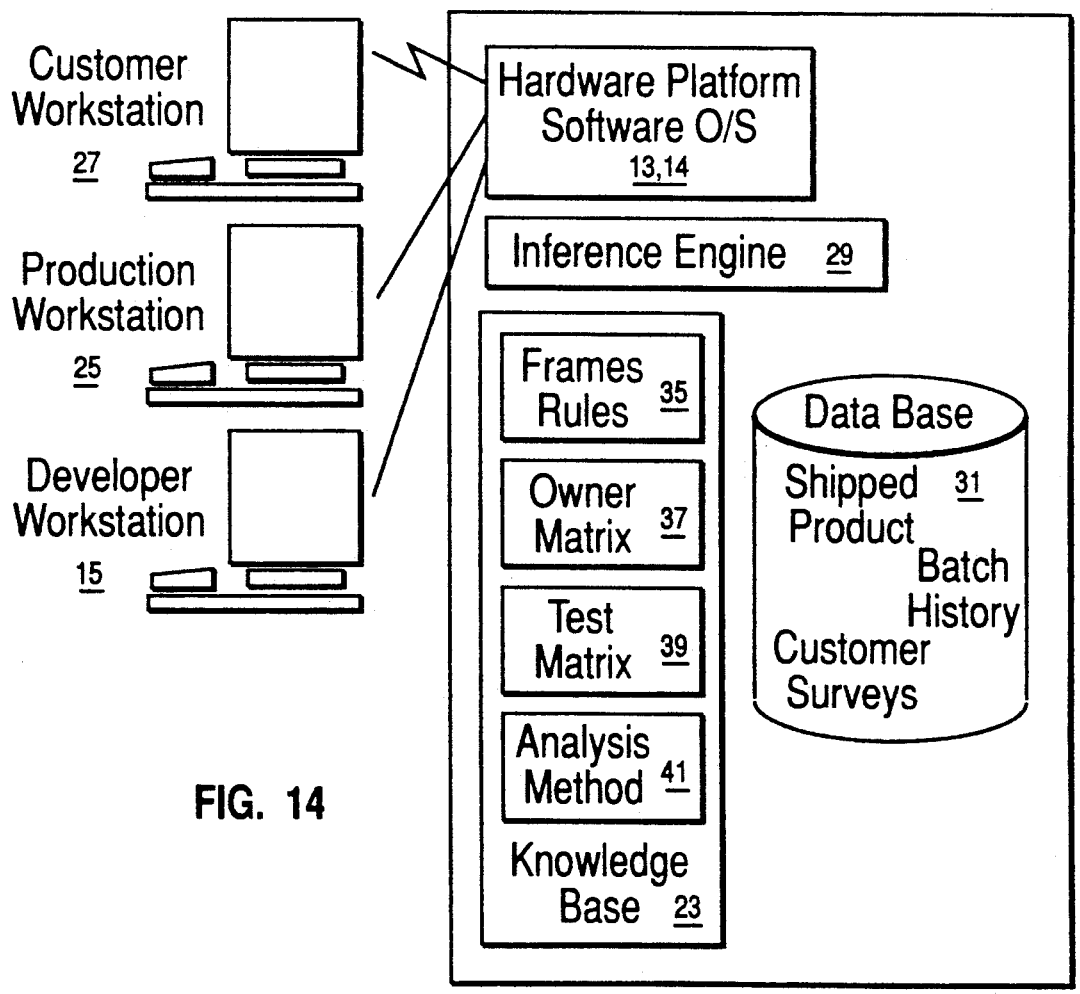
FIG. 14 is a schematic of the present invention including the hardware and software platforms and the knowledge base with a link to production data.

Next, a dynamic extension of the previously described system to include production data will be described. Referring to FIG. 14, a schematic representation of a system including production data is shown.

The previously discussed developer workstation 15 along with a production workstation 25 and customer workstation 27 are shown interconnected into a hardware platform 14 and a software operating system 13. An inference engine 29 operates in conjunction with the hardware and software platforms 13, 14 and is used to manipulate the data in the knowledge base 23. The customer needs and product properties frames are stored in knowledge base 23 and designated by reference numeral 35. Additionally, data corresponding to production process ownership 37, test results 39 and analysis methods 41 are included in the knowledge base 23 and stored there, in a manner previously discussed with regard to the customer needs and product properties. A database 31 is also included in the system and stores such information as customer surveys, batch history information regarding the process being implemented, and information regarding the shipped products. In order to tie in, or link, the production data with the knowledge base records must be created for the test results product properties, owner information and product property analysis methods. These records are stored in a separate file using a known database technique. Further, the records provide descriptions of the location in database 31 for the particular production data to be linked, e.g. owner, analysis methods and the like.

Referring to FIG. 16, a type E record is shown which has been separated into two slightly different forms that are identical in content but differ in that this production data will ultimately be obtained from different locations in database 31. The first type E record is the test results record and the second is the process parameter records. For example, the test result records include the data that was delivered with the product at the time of purchase, or data taken as a lab test, on-line test step, or the like. Referring to FIG. 16 in the test results record, the Property Name field is identical to the Description entry in a product property record, such as shown in FIG. 4. The Property Size/Definition entry defines space allocation for the database in which the record is initially stored. The process parameter records include data generated by production equipment as part of a manufacturing step, e.g. the duration of a spot welding operation for attaching a car body to a frame. Thus, the process parameter records include a machine control, or adjustment. The Property Name field in the parameter record is again identical to the description entry on a type B record as shown in FIG. 4. The Property Size/Definition field again defines space and allocation for the database. It should be noted that database tools vary with the type of hardware platform utilized. The present invention is hardware and software independent by allowing the field type in the record to have variable types and lengths, that is alphabetic, numerical or alphanumeric. Another aspect of the present invention that will avoid any hardware dependencies is the use of a key or pointer which is included on the test results and process parameter records. This pointer will use the Property Name of either the process parameters or test results record.

Figures 17, 18, 19:
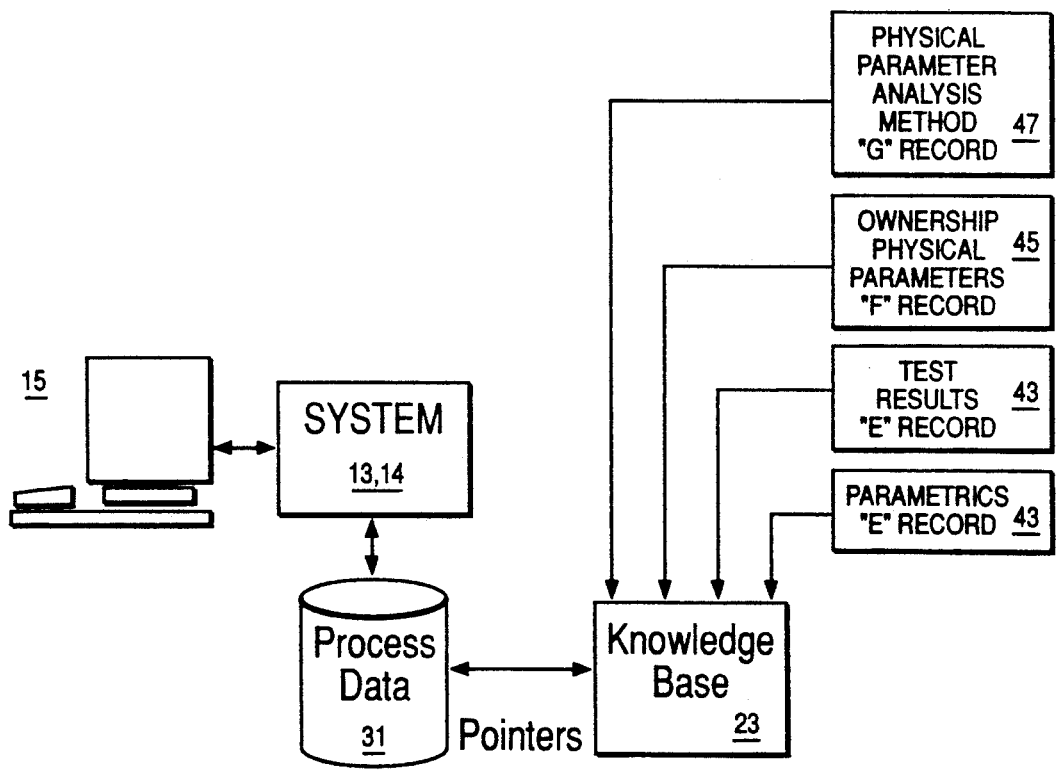
FIG. 17 is a record which includes data relating to the product property owner.
FIG. 18 is a record including data relating to product property analysis methods.
FIG. 19 shows the present invention including the actual production data and its relationship to the system of the present invention shown in FIG. 14.

It is very important in a production process that a specific parameter be assigned an owner that has responsibility for taking action in the event a problem, that can be tracked to the specific process parameter, is identified as relating to an individual product property. FIG. 17 is a type F product property owner record that is generated as discussed below with regard to FIG. 25 by a user of the system. The Property Name field is identical to the Description field of a product property record as shown in FIG. 4. The Owner field of FIG. 17 is textual in nature and has meaning to a user of the system when displayed by the system display hardware. That is, if in the previous example describing the process of spot welding, it is determined that problems are arising due to weak spot welding joints, the responsible party or department can be tracked and the pertinent information displayed from the Owner field of the record of FIG. 17.

FIG. 18 shows a type G product property analysis method record wherein the Property Name is again identical to the Description of the product property of FIG. 4. The product property analysis method is the description of an appropriate algorithm to evaluate the property's state, like a simple average of the composition of the product. For example, the volume of pigment included in every gallon of paint sprayed on an automobile body is an example of an average value addressed by the type G product analysis method record. Of course, there are many ways to obtain the average such as taking the arithmetic mean or averaging the last 5 to 30 values, sometimes referred to as a moving average.

FIG. 19 is a schematic representation of the present invention including process data with the E, F and G type records. Again, a user workstation 15 is interconnected to the operating system 13 and hardware 14, which is interconnected with the process database 31. Pointers are included between the process data 31, the knowledge base 23 and the E records 43, F records 45, and G records 47. It should be noted that the structure and appearance of the user interface will depend upon the operating system 13 being utilized, e.g. OS/2, AIX or the like.

Next, links must be established between the E, F, and G records and the previously described customer and property frames of FIGS. 10, 11 and 15. It should be noted that some of the entries for the frames of 10 and 11 were left intentionally blank as a null and may now be utilized to relate these frames with the E, F, and G records. Further, the knowledge base system 23, as shown in FIG. 24, will be updated to reference the production data as well as the previously stored knowledge base representation of the customer and product frames (the KBS references production data by using pointers supplied by the E, F, G type records).

Figure 25:
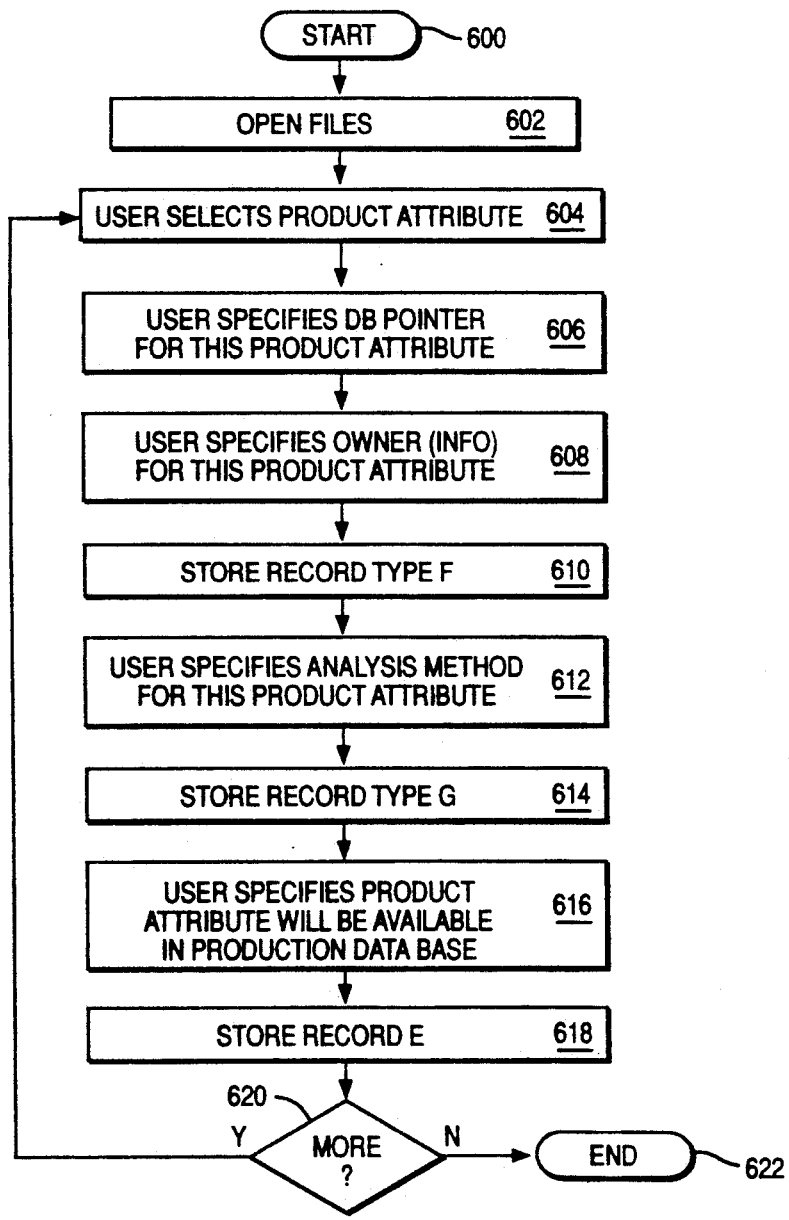
FIG. 25 is a flowchart representing the steps needed to open the records shown in FIGS. 16–18.

FIG. 25 is a flowchart representing the steps required to create and store the E, F and G records shown in FIGS. 16-18. At step 600 the process is started and files in the production database 31 are opened at step 602. The user selects the product property attribute at step 604 and a database pointer for this particular selected attribute is specified at step 606. The owner information for the product attribute is then specified at step 608 and stored in KB 23 at step 610 as an F type record. At step 612, the user specifies the analysis method for the particular product attribute and this information is stored in KB 23 as a type G record at step 614. At step 616 the test results and process parameters for the specified product are found in the production database and this information is stored in KB 23 as a type E record in step 618. Step 620 determines whether there are more E, F, are G type records to create and if so returns to step 604 where the product attribute is selected, otherwise the process continues to step 622 and ends.

Figures 20, 21:
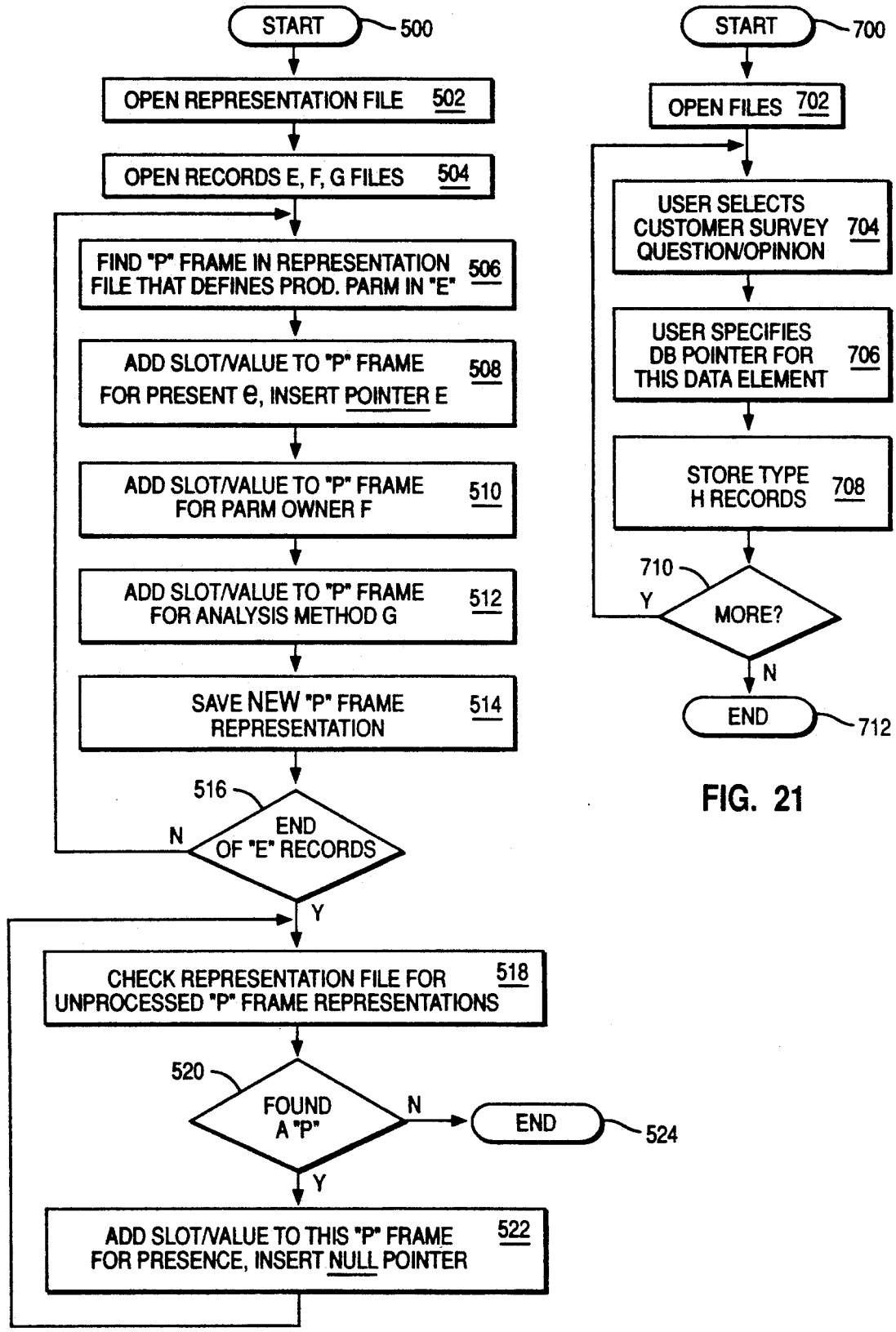
FIG. 20 is a flowchart showing the steps required to make the dynamic linkage between the product property frames and the data within the records of FIGS. 16–18.
FIG. 21 is a flowchart showing the steps required to open records which include data relating to a customer survey.

The stored E, F, and G records then must be linked to the customer needs and product property frames as shown in FIGS. 10 and 11. FIG. 20 is a flowchart representing the steps required to create the link, or relationship between the E, F, and G records and the customer and product frames. At step 500 the process is started and a representation file, created by the process of the flowchart of FIG. 25, is opened at step 502. The individual E, F, and G record files are then opened at step 504. Next, the product frame is found in the representation file which defines the product parameter defined by the E type record (Step 506). At step 508, a slot/value is added to the product frame for the current process parameter in the E type record and a pointer is inserted into the product frame for the E type record. Similarly, a slot/value is added to the product frame for the product parameter owner of the F type record at step 510. Further, a slot/value is added to the product frame for the analysis method parameters included in the G type records at step 512. The new product frame representation with this additional data is stored at step 514, and step 516 determines if all of the E type records have been processed. If not, the process returns to step 506 and a new E type record is opened. However if all the E, F, and G records have been processed the method continues to step 518 where the representation file is checked for unprocessed product frame representations. If an unprocessed product frame is found then a slot/value is added to this frame and a null pointer is inserted therein. Processing then returns to step 518 and again checks for unprocessed product frames. When no unprocessed product representations remain the flowchart continues to step 524 and ends. In other words, each E, F and G record is processed by system logic to link a specific product property frame with the parameter contained therein. More particularly, for the E type records the product property frame with the identical frame name to that of the property name field of the type E record, such as shown in FIG. 16 is found. This Property Name field for the type E record is then placed in the value field of the slot frame instance of FIG. 11 named DB/Key and the linking process continues until all of the type E results parameters records of FIG. 16 have been exhausted. To link the type F product property owner record the product frame having the frame name identical to the property name field of the type F record of FIG. 17 is found. The Owner field of a type F record, as shown in FIG. 17 is then placed in the value field slot of the product frame Owner (FIGS. 11 and 17). Again, the linking process continues until all of the type F records are exhausted. Linking of the type G analysis method records is performed by finding the product frame having a frame name identical to that of the Property Name field of the type G record, as shown in FIG. 18. The Method field of the type G record is then placed in the value field of the slot of the product frame field Method (see FIGS. 11 and 18). Again, this linking process continues between the product frames and the type G records until all product analysis records have been exhausted. Subsequent to the slot/values of the product frame being updated to link the E, F and G records, the updated product frames are transferred to permanent storage in the knowledge base 23. Thus far it has been described how the product property information matrix 5 (type B records) stored in the House of Quality 1 of FIG. 1 can be dynamically linked to the product process data used in the actual manufacturing process being implemented.

Figure 22:
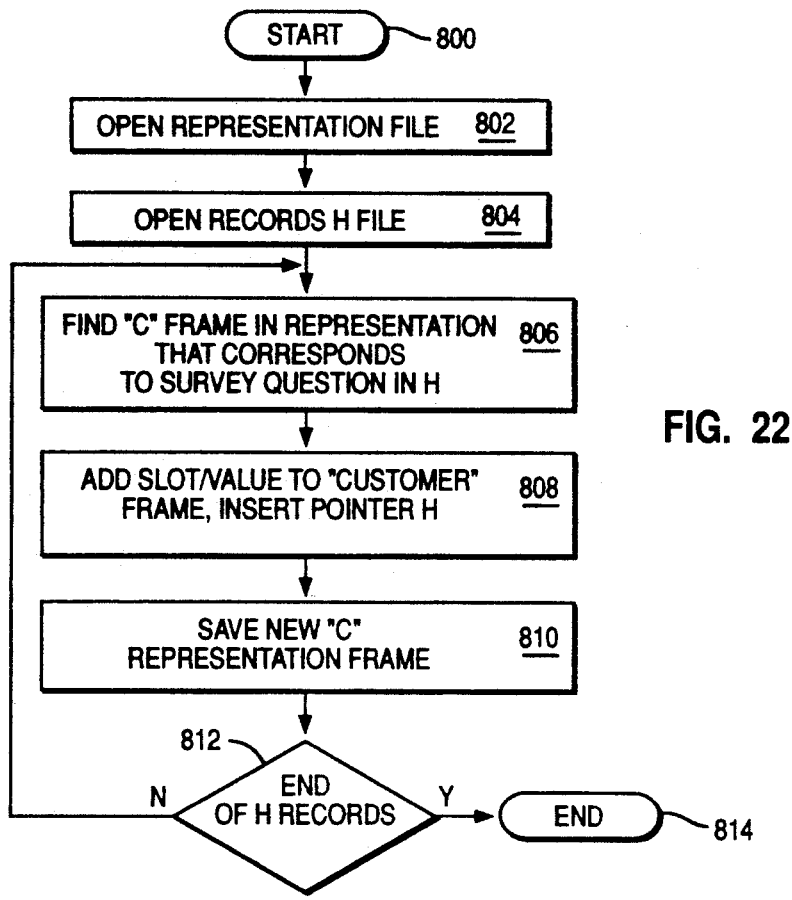
FIG. 22 is a flowchart showing the steps required to relate information in the customer survey record with the customer needs frame of FIG. 10.
Figure 23:
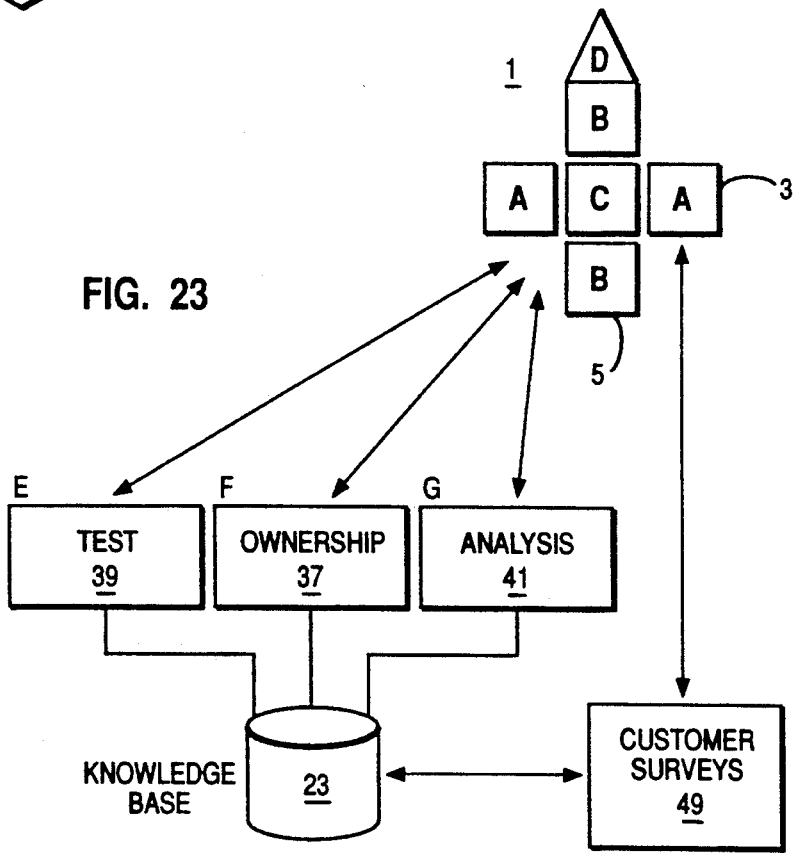
FIG. 23 is a schematic diagram showing the relationship between the customer survey record, the House of Quality and the knowledge base which includes the production data.

It will now be seen with reference to FIGS. 21-23 how the customer needs matrix 3 of the House of Quality 1 (type A records) can be dynamically linked with customer survey (type H records) data in order to dynamically extend and link the customer needs data of matrix 3 with customer survey data in order to obtain feedback regarding how well the customer needs are being met. Referring to FIG. 21 a flowchart including the process steps required to set up a customer survey database is shown. At step 700 the process is started and the database files are opened at step 702. A user then selects the customer survey question/opinion entry from a menu on a screen and responds to customer survey prompts generated by an operating system 13 (step 704). The user then specifies the database pointer for the customer survey question/data element at step 706 and the H type records, including data relating to the customer responses are then stored at step 708. It is then determined at step 710 whether additional H records exist and if so the process returns to step 704. However, if no additional H type records are to be opened then the method ends at step 712. Subsequent to the processing of the flowchart of FIG. 21, a type H customer survey record is generated and will be similar to the records of FIG. 17, with Customer Need replacing the Property Name field and a Survey Question field replacing the Owner field.

FIG. 22 is a flowchart describing the methods used to link the customer survey question data with the Customer Need frame (FIG. 10) previously stored within the knowledge base 23. At step 800 the process is started and the representation file having the H record stored therein is opened at step 802. Individual H records are then opened at step 804. The Customer Need frame in the knowledge base 23 is then found which corresponds to the survey question contained in the opened H type record (step 806). At step 808, a slot/value is added to the customer frame and a pointer is inserted therein which refers to, or links the customer frame to the survey question. The new C frame representation, with the H pointer therein, is then saved at step 810 and step 812 determines whether additional H records exist and if so returns to step 806. If no more H records exist that are to be processed then the method proceeds to step 814 and ends. More particularly a customer frame as shown in FIG. 10 will be found having a description identical to the description of the H record which has been opened at step 804. The pointer may be placed in the slot/value field under the Rank My Product field of FIG. 10. Thus, it can be seen how the customer survey data and the customer need frames are dynamically linked to one another by the system of the present invention.

It will also be understood by those skilled in the art that the means of interlinking the customer survey data with the customer need frames is virtually identical to the means for dynamically linking the product process data (the E, F and G records) with the product frames, as previously discussed. In short, the present invention provides for dynamic linking of product data in a House of Quality with the actual manufacturing process data, and the customer needs data in the House of Quality with the customer survey feedback information. FIG. 23 schematically represents this relationship and shows House of Quality 1 having matrices 3 and 5. A knowledge base 23 includes test records 39, ownership records 37 and analysis records 31 which are all dynamically linked to the product property frames (including the B type record information) previously stored in a knowledge base 23. Similarly, the H records for customer surveys 49 are dynamically linked via the knowledge base 23 to the customer need matrix 3 in the House of Quality 1.

The present invention provides a tool that allows a user to dynamically relate specific customer need and product property data with the actual production process data and customer survey data. For example the user may issue a command that brings up a menu of parameters (E records) for a specific product from House of Quality 1. At this point, the user may select product parameter(s) such that ownership data will be displayed from the production database for the product parameter(s) selected. Additionally, the user could display the corresponding product frame and any related customer needs frames. Thus it can be seen how a user of the present invention may use the dynamically linked House of Quality data and production process data as a manufacturing tool. Similarly, customer needs data from the House of Quality can be displayed such that a user will know if the customer needs from matrix 3 of FIG. 1 are being addressed by viewing the dynamically linked customer needs and corresponding customer survey data.

Thus it can be seen that a manufacturing process design professional, as well as marketing professionals will benefit from the present invention, since vast amounts of customer need and product property data, which is dynamically linked to each other and the actual production process data and customer survey data, can be made available through a user workstation. Moreover, the House of Quality data becomes part of the ongoing control system of the manufacturing process rather than remaining a static design tool.

Although certain preferred embodiments have bee shown and described it should be understood that many changes and modifications may be made therein without departing from the scope of the appended claims.

What is claimed is:

1. A method, implemented on a computer system for creating a process design system, used in conjunction with a production process having at least one product parameter, that dynamically links data, related to the quality of a product being produced by said process, with the production process data, comprising:
   creating and storing, on said computer system, said quality data in a first database;
   mapping said quality data into a frame type representation and storing said mapped quality data in a knowledge database on said computer system;
   creating and storing, on said computer system, said production data in a second database;
   inserting, at least one pointer, into said mapped quality data to relate said quality data with said production data; and
   changing a state of said at least one product parameter based on said quality data.

2. A method according to claim 1 wherein said quality data comprises customer need information and product property information.

3. A method according to claim 2 wherein said production data comprises product parameter information, ownership information test results information, analysis method information and customer survey information.

4. A method according to claim 3 wherein said frame type representation comprises at least one frame including a slot field for storing descriptive and relational information regarding said quality data, and a value field for storing information referencing at least one other frame.

5. A method according to claim 4 wherein said step of mapping comprises:
   storing templates representative of said at least one frame in a third database;
   placing said customer need quality data into the slot and value fields within corresponding customer needs frame templates, thereby creating customer needs frames;
   placing said product property quality data into the slot and value fields within corresponding product property frame templates, thereby creating product property frames; and
   linking at least one of said product property frames with at least one other of said product property frames or at least one of said customer needs frames.

6. A method according to claim 5 wherein said step of linking comprises searching for a common scalar name in the value field of said at least one other of said product property frames or at least one of said customer needs frames.

7. A method according to claim 6 wherein said step of inserting at least one pointer comprises:
   searching for a corresponding product property frame having a property name identical to a product name within the product parameter information; and
   referencing said product parameter information in said corresponding product property frame by placing the property name field from the product parameter information in the value field of a parameter slot in the corresponding product property frame.

8. A method according to claim 6 wherein said step of inserting at least one pointer comprises:
   searching for a corresponding product property frame having a frame name identical to a property name field contained within said ownership information; and
   referencing said ownership information in said corresponding product property frame by placing the owner field from the ownership information in the value field of an owner slot in the corresponding product property frame.

9. A method according to claim 6 wherein said step of inserting at least one pointer comprises:
   searching for a corresponding product property frame having a frame name identical to a property name field within said test results information; and
   referencing said test results information in said corresponding product property frame by placing the test field from the test results information in a value field of a test slot in the corresponding product property frame.

10. A method according to claim 6 wherein said step of inserting at least one pointer comprises:
    searching for the corresponding product property frame having a frame name identical to a property name field within said analysis methods information; and
    referencing said analysis methods information in said corresponding product property frame by placing a method name field from the analysis methods information in a value field of a method slot in the corresponding product property frame.

11. A method according to claim 6 wherein said step of inserting at least one pointer comprises:
  searching for the corresponding customer needs frame having a description identical to a description field in the customer survey information; and
  referencing said customer survey information in said corresponding customer needs frame by placing a product ranking field from the customer survey information in a value field of a rank my product slot in the corresponding customer needs frame.

12. A process design system, used in conjunction with a production process, having at least one product parameter, that dynamically links data, related to the quality of a product being produced by said process, with the production process data, comprising:
  means for creating and for storing said quality data in a first database;
  means for mapping said quality data into a frame type representation and storing said mapped quality data in a knowledge database;
  means for creating and for storing said production data in a second database;
  means for inserting, at least one pointer, into said mapped quality data to relate said quality data with said production data; and
  means for providing said quality data to said production process such that said at least one product parameter is changed based on said quality data.

13. A system according to claim 12 wherein said quality data comprises customer need information and product property information.

14. A system according to claim 13 wherein said production data comprises product parameter information, ownership information, test results information, analysis method information and customer survey information.

15. A system according to claim 14 wherein said frame type representation comprises at least one frame including a slot field for storing descriptive and relational information regarding said quality data, and a value field for storing information referencing at least one other frame.

16. A system according to claim 15 wherein said means for mapping comprises:
  means for storing templates representative of said at least one frame in a third database;
  means for placing said customer need quality data into the slot and value fields within corresponding customer needs frame templates, thereby creating customer needs frames;
  means for placing said product property quality data into the slot and value fields within corresponding product property frame templates, thereby creating product property frames; and
  means for linking at least one of said product property frames with at least one other of said product property frames or at least one of said customer needs frames.

17. A system according to claim 16 wherein said means for linking comprises means for searching for a common scalar name in the value field of said at least one other of said product property frames or at least one of said customer needs frames.

18. A system according to claim 17 wherein said means for inserting at least one pointer comprises:
  means for searching for a corresponding product property frame having a property name identical to a product name within the product parameter information; and
  means for referencing said product parameter information in said corresponding product property frame by placing the property name field from the product parameter information in the value field of a parameter slot in the corresponding product property frame.

19. A system according to claim 17 wherein said means for inserting at least one pointer comprises:
  means for searching for a corresponding product property frame having a frame name identical to a property name field contained within said ownership information; and
  means for referencing said ownership information in said corresponding product property frame by placing the owner field from the ownership information in the value field of an owner slot in the corresponding product property frame.

20. A system according to claim 17 wherein said means for inserting at least one pointer comprises:
  means for searching for a corresponding product property frame having a frame name identical to a property name field within said test results information; and
  means for referencing said test results information in said corresponding product property frame by placing the test field from the test results information in a value field of a test slot in the corresponding product property frame.

21. A system according to claim 17 wherein said means for inserting at least one pointer comprises:
  means for searching for the corresponding product property frame having a frame name identical to a property name field within said analysis methods information; and
  means for referencing said analysis methods information in said corresponding product property frame by placing a method name field from the analysis methods information in a value field of a method slot in the corresponding product property frame.

22. A system according to claim 17 wherein said means for inserting at least one pointer comprises:
  means for searching for the corresponding customer needs frame having a description identical to a description field in the customer survey information; and
  means for referencing said customer survey information in said corresponding customer needs frame by placing a product ranking field from the customer survey information in a value field of a rank my product slot in the corresponding customer needs frame.

23. A process design system, used in conjunction with a production process, that dynamically links quality data, including customer need and product property information, of a product being produced by said process, with production process data including product parameter information, ownership information, test results information, analysis method information and customer survey information, comprising:
  means for creating and for storing said quality data in a first database;
  means for creating and for storing said production data in a second data base;
  means for mapping said quality data into a frame type representation including at least one frame with a slot field for storing description and relational information regarding said quality data, and a value field for storing information referencing at least one other frame, and for storing said mapped quality data in a knowledge database, said means for mapping including:

means for storing templates representative of said at least one frame in a third database;

means for placing said customer need quality data into the slot and value fields within corresponding customer needs frame templates, thereby creating customer needs frames;

means for placing said product property quality data into the slot and value fields within corresponding product property frame templates, thereby creating product property frames; and means for linking at least one of said product property frames with at least one other of said product customer needs frames, and for searching for a common scalar name in the value field of said at least one other of said product property frames or at least one of said customer needs frames; and means for inserting at least one pointer into said mapped quality data to relate said quality data with said production data, including means for searching for the corresponding product property frame having a frame name identical to a property name field within said analysis methods information, and for referencing said analysis methods information in said corresponding product property frame by placing a method name field from the analysis methods information in a value field of a method slot in the corresponding product property frame.

24. A method, implemented on a computer system for creating a production process, that dynamically links quality data, including customer need and product property information, of a product being produced by said process, with production process data including product parameter, ownership, test results, analysis method and customer survey information, said method comprising the steps of:

creating and storing said quality data in a first database on said computer system;

creating and storing said production data in a second data base on said computer system;

mapping said quality data into a frame type representation including at least one frame with a slot field for storing description and relational information regarding said quality data, and a value field for storing information referencing at least one other frame, and for storing said mapped quality data in a knowledge database on said computer system, said step of mapping including the steps of:

storing templates representative of said at least one frame in a third database;

placing said customer need quality data into the slot and value fields within corresponding customer needs frame templates, thereby creating customer needs frames;

placing said product property quality data into the slot and value fields within corresponding product property frame templates, thereby creating product property frames; and linking at least one of said product property frames with at least one other of said product customer needs frames, and for searching for a common scalar name in the value field of said at least one other of said product property frames or at least one of said customer needs frames; and inserting, at least one pointer, into said mapped quality data to relate said quality data with said production data, including the steps of searching for the corresponding product property frame having a frame name identical to a property name field within said analysis methods information, and referencing said analysis methods information in said corresponding product property frame by placing a method name field from the analysis methods information in a value field of a method slot in the corresponding product property frame.

* * * * *